United States Patent
Youmans

[15] 3,662,172
[45] May 9, 1972

[54] RADIOACTIVITY WELL LOGGING SYSTEM HAVING A PAD MOUNTED NEUTRON SOURCE AND A CENTRALIZED RADIATION DETECTOR THAT PROVIDES COMPENSATION FOR BOREHOLE FLUID DENSITY AND BOREHOLE DIAMETER VARIATIONS

[72] Inventor: Arthur H. Youmans, Houston, Tex.
[73] Assignee: Dresser Industries, Inc., Dallas, Tex.
[22] Filed: Oct. 24, 1969
[21] Appl. No.: 869,082

[52] U.S. Cl. .............................250/83.3 R, 73/151, 73/152, 250/71.5 R, 250/83.6 W
[51] Int. Cl. .........................................G01t 3/00, G01v 5/00
[58] Field of Search.........................250/83.6 W, 83.3, 71.5; 73/151, 152

[56] References Cited

UNITED STATES PATENTS

| | | | |
|---|---|---|---|
| 2,935,615 | 5/1960 | True.................................250/83.6 W |
| 3,038,075 | 6/1962 | Youmans........................250/83.6 W |
| 3,368,195 | 2/1968 | Peterson..........................250/83.6 W |
| 3,508,439 | 4/1970 | Alger...............................250/83.6 W |

Primary Examiner—James W. Lawrence
Assistant Examiner—Morton J. Frome
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A well logging instrument adapted for traversing an earth borehole has a plurality of neutron sources mounted in pads which contact the wall of the earth borehole. The radiation detector is centralized in the borehole and the system provides compensation for natural gamma radiation and variations in borehole fluid density and borehole diameter.

8 Claims, 2 Drawing Figures

INVENTOR
ARTHUR H. YOUMANS

INVENTOR
ARTHUR H. YOUMANS
ATTORNEY

RADIOACTIVITY WELL LOGGING SYSTEM HAVING A PAD MOUNTED NEUTRON SOURCE AND A CENTRALIZED RADIATION DETECTOR THAT PROVIDES COMPENSATION FOR BOREHOLE FLUID DENSITY AND BOREHOLE DIAMETER VARIATIONS

This invention relates to radioactivity well logging in general, and more particularly, to a system for logging the effects of neutron bombardment that eliminates the errors due to borehole diameter variations and other variable borehole parameters such as borehole fluid density variations and tool standoff.

It is well known in the prior art to irradiate the formations surrounding a borehole with neutrons and detect radiation from the formations resulting from the neutron bombardment. If prompt radiation is measured the system may be referred to as neutron logging and if delayed radiation is measured the system is termed activation logging because such radiation is caused by activated elements in the formations.

One of the most serious limitations of activation well logging systems of the prior art stems from the fact that measurements have been influenced by borehole diameter variations and other borehole effects. Activation well logging instruments of the prior art have been long and rigid making it impossible for both the detector and the neutron source to remain in contact with the wall in uneven boreholes. On this account, activation logs such as silicon logs and aluminum logs have been observed to be so adversely influenced by borehole variations as to be of little practical value. This is because of the twofold influence of borehole size on prior art activation logging systems: first, any enlargement of hole diameter reduces the intensity of neutron irradiation because of borehole fluid absorption of the neutrons; and it reduces the efficiency with which the radiation is detected because of the increased distance between the formation and the detector. The present invention overcomes both these difficulties by eliminating the former and providing compensation for the latter.

In accordance with the present invention, a well logging instrument that traverses an earth borehole is provided which has a neutron source that contacts the borehole wall. The neutron source is contained in a pad attached to the end of an arm that extends from the central axis of the instrument and a means to provide a continuous caliper of the borehole diameter is included. The neutron source may consist of a plurality of individual sources contained within a plurality of pads each attached to individual arms that extend from the body of the instrument. The plurality of sources, pads, and arms centralize the instrument in the borehole and serve to attenuate the neutron flux within the borehole relative to that directed outwardly. The radiation detector is located in a trailing relationship to the neutron source and is surrounded by a rubber or plastic annulus which partially displaces the borehole mud.

Prior art activation well logging systems have also encountered difficulties due to the effect of natural gamma radiation existing in the formations surrounding the borehole, since the radiation detector senses both the natural radiation and induced activation radiation. Both are influenced by variations in borehole diameter since the mud absorption and radiation travel distance depend on borehole diameter.

The system of the present invention includes a second gamma radiation detector identical to the first located ahead of the neutron sources to provide a natural gamma ray log which can be directly subtracted from the activation log. In addition, this system provides means to correct the activation measurement for the effect of borehole variation. An analog device applies correction based on the caliper measurement and the borehole fluid density. The caliper signal is stored in a conventional manner and delayed to correspond to detector depth. This delayed signal controls the amount of correction to be applied to the measured activation.

In one embodiment, the compensation circuit is equipped with a borehole fluid density adjustment which is set by the operator in accordance with the known borehole fluid density. In another embodiment, means to continuously measure the effect of borehole fluid density and borehole size variation on the activation signal is provided in the subsurface instrument. This signal may then be employed to automatically vary the magnitude of correction and produce an improved activation log. The latter means may also be used to compensate radioactivity logs other than activation logs.

It is to be understood that the system may also be used in other logging systems such as neutron logging wherein the radiation from the formations is prompt radiation.

It is therefore an object of the present invention to provide a well logging system that reduces the inaccuracies due to borehole diameter variations.

It is a further object of the present invention to provide a well logging system that reduces the inaccuracies due to tool standoff.

It is still a further object of the present invention to provide a well logging system that reduces the inaccuracies due to variation in borehole fluid density.

It is a still further object of the present invention to provide a well logging system including a plurality of neutron source units that remain in contact with the borehole wall during the measuring operations.

It is a still further object of the present invention to provide an instrument that will remain centralized in the borehole during the measuring operation.

It is still further object of the present invention to provide a well logging system that will provide a continuous caliper of the borehole diameter.

The above and other objects and advantages of the present invention will become apparent from a consideration of the following detailed description when taken in conjunction with the accompanying drawing wherein.

Figure 1:
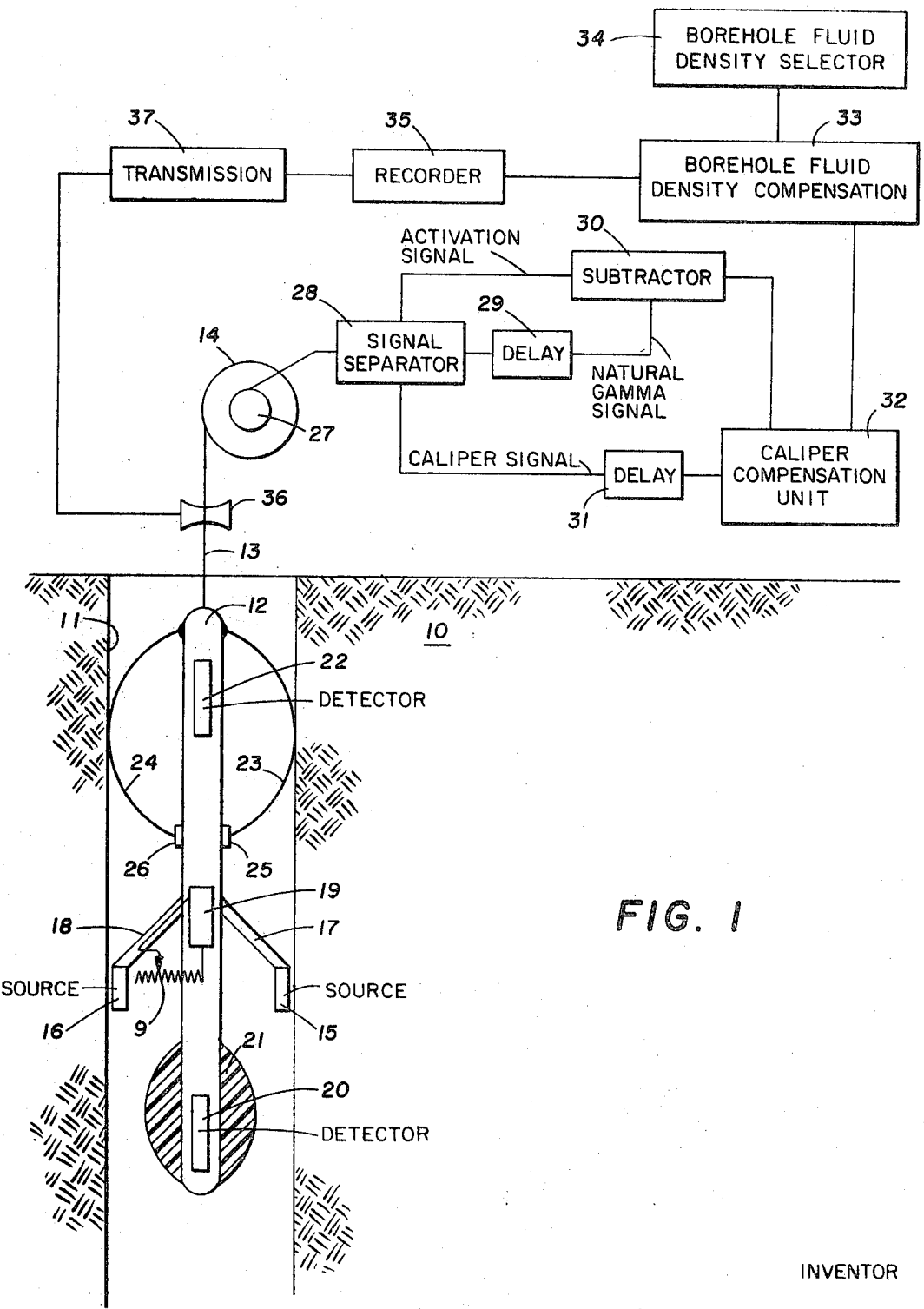
FIG. 1 illustrates schematically a side elevation partly in cross section of a borehole instrument representing one embodiment of the invention.

Referring now to FIG. 1, there is illustrated a portion of the earth's surface 10 traversed by an earth borehole 11. A well logging instrument 12 is suspended in the borehole by a logging cable 13, the cable 13 being wound on a drum 14 at the earth's surface. The instrument 12 contains a pair of neutron sources 15 and 16. The neutron sources consist of encapsulated californium-252 mounted in pads adapted to slide along the walls of the borehole. While two neutron sources are shown, it is to be understood that a single neutron source or a plurality of neutron sources are contemplated. If the formation around the borehole is homogeneous and the borehole is circular, equally good results will be obtained with a single source. In other cases a multiplicity of sources is preferred in order that the formation be irradiated symmetrically. It is also to be understood that neutron sources other than californium-252 may be used, for example, americum-beryllium, radium-beryllium, and plutonium-beryllium. Californium-252 is preferred because of its relatively short half life, making it less of a hazard should it be lost in a borehole.

The neutron sources 15 and 16 are mounted in pad units attached to the ends of arms 17 and 18. Arms 17 and 18 keep the sources in contact with the borehole wall as the instrument logs the borehole and aids in centralizing the instrument 12 in the borehole. The instrument is shown schematically and it is to be understood that the arms 17 and 18 are retractable to allow the instrument to move freely through the borehole when desired. Retraction and extension of the arms may be controlled from the surface according to systems well known in the art, thereby allowing the arms to be placed in the retracted position and the instrument moved to the portion of the borehole to be logged. The arms are then extended and the instrument is ready for operation. The extension and retraction means also provide the force required to hold the pads in contact with the borehole wall during logging. Pad units attached to arms that extend from a central instrument are well known in the well logging art. An example of this type of pad unit is shown in U.S. Pat. No. 3,068,400 to Castel et al.

Unit 19 generates a borehole caliper signal that may be transmitted to the surface along cable 13. The borehole caliper signal may be obtained by a potentiometer 9 with the movable tap attached to one of the arms and the potentiometer body attached to the body of instrument 12. The potentiometer is shown attached between arm 18 and the body of instrument 12 for illustrative purposes. The position of arm 18 relative to the body of instrument 12 determines the amount of resistance in the potentiometer circuit, hence an electrical signal may be obtained representing a caliper of the borehole. It is to be understood that other means of generating a borehole caliper signal are known in the well logging art and such other means may be used in conjunction with instrument 12 without departing from the invention.

An activation radiation detector 20 is located in a trailing position with reference to the neutron sources. The distance between the sources and detector being sufficient to prevent radiation from the sources from obscuring the radiation being measured. As the instrument is moved through the borehole detector 20 detects radiation from elements in the formations that have been activated by neutrons from sources 15 and 16 and transmits an electrical signal representing this activation to the surface by cable 13. Activation radiation detector 20 may be a Geiger counter, scintillation counter, or other state of the art detectors and it is to be understood that other logging measurements are within the scope of this invention. A rubber or plastic annulus 21 surrounds detector 20 to displace mud encountered in the borehole and thereby reduces any contribution to the activation measurement due to drilling mud activation.

Instrument 12 also contains a detector 22, identical to the activation detector, mounted to precede the neutron sources as the instrument traverses the borehole. The distance between the sources and detector 22 being sufficient to prevent radiation from the sources from obscuring the radiation detected by detector 22. This detector 22 produces a signal representing natural gamma radiation existing in the formations. Since the signal generated by activation detector 20 consists of radiation resulting from activated elements in the formations plus the natural radiation existing in the formations, a signal representing only activation radiation may be obtained by delaying the natural gamma signal from detector 22 an appropriate length of time so as to correspond to the activation signal from the same borehole location and then subtracting the natural gamma signal from the activation signal. The subtraction may be done in the subsurface instrument or as hereinafter explained, the individual signal may be transmitted to the surface equipment and processed there.

Flexible members 23 and 24 help centralize instrument 12 in the borehole. These flexible members may be extended and retracted by movement of elements 25 and 26 along the side of instrument 12. Alternatively the flexible members may be extended and retracted by means well known in the art, for example, according to the system shown in U. S. Pat. No. 3,200,251 to A. H. Youmans. It is to be understood that this extension and retraction may be controlled from the earth's surface by a suitable control system (not shown in the drawing).

The various signals from the subsurface components of instrument 12 are transmitted along cable 13 to the earth's surface. Conventional means 27, including slip rings and brushes, are provided to conduct the signal from cable 13 to signal separator unit 28 wherein it is divided into its component parts. The component parts of the signal are respectively, the activation signal from detector 20, the natural gamma radiation signal from detector 22 and the caliper signal from unit 19. The natural gamma radiation signal is transmitted to delay unit 29 wherein it is delayed an appropriate length of time so as to correspond to the activation signal from the same depth. The length of time delay provided depends upon the distance between detectors 20 and 22 and upon the speed at which the instrument 12 is being moved through the borehole.

The natural gamma radiation signal is transferred from delay 29 to subtractor 30 and the activation signal is transferred from signal separator 28 to subtractor 30. The resultant signal from subtractor 30 represents the difference between the activation signal and the natural gamma signal, in other words an improved activation signal with the influence of natural radiations existing in the formations having been greatly reduced, if not completely eliminated.

The caliper signal is transferred from signal separator 28 to delay unit 31 wherein it is delayed an appropriate length of time so as to correspond to the activation signal from the same depth. Although various delay circuits are known to those in the art, one could, if desired, use a delay line such as that illustrated on pages 28 and 29 of Digital Computer Principles, Published by the McGraw Hill Book Co. in 1962 (Library of Congress Catalog Card No. 62-13207). The caliper signal is then transferred to caliper compensation unit 32 along with the activation signal from subtractor 30. Unit 32 may be an analog device wherein the correction applied to the activation signal depends upon the magnitude of the caliper signal. Although various subtraction, caliper compensation units, borehole fluid density compensation and borehole fluid density selector circuits are known in the art, examples of such circuits are discussed at length in the U. S. Pat. No. 3,538,329 to F. J. Niven, Jr., assigned to the assignee of the present application.

The caliper compensation unit 32 is connected to borehole fluid density compensation unit 33 such that the known density of the borehole fluid influences the amount of compensation made in the activation signal. The amount of correction applied due to caliper variations depends on the borehole fluid density. This may be controlled by adjusting a selector 34. It is to be understood that unit 33 could also be controlled automatically by a subsurface device that would continuously measure the borehole fluid density as the logging instrument traverses the borehole.

The activation signal is then transmitted to a recorder 35. The activation signal may be correlated with depth in the borehole by providing a measuring sheave 36 which contacts cable 13. Sheave 13 drives a transmission 37 which in turn drives the recorder 35, so that the information recorded is related to depth in the borehole. It is to be understood that both the natural gamma signal and the activation signal could be compensated for the effects of variation in borehole diameter and borehole fluid density and then the natural gamma signal subtracted from the activation signal.

Figure 2:
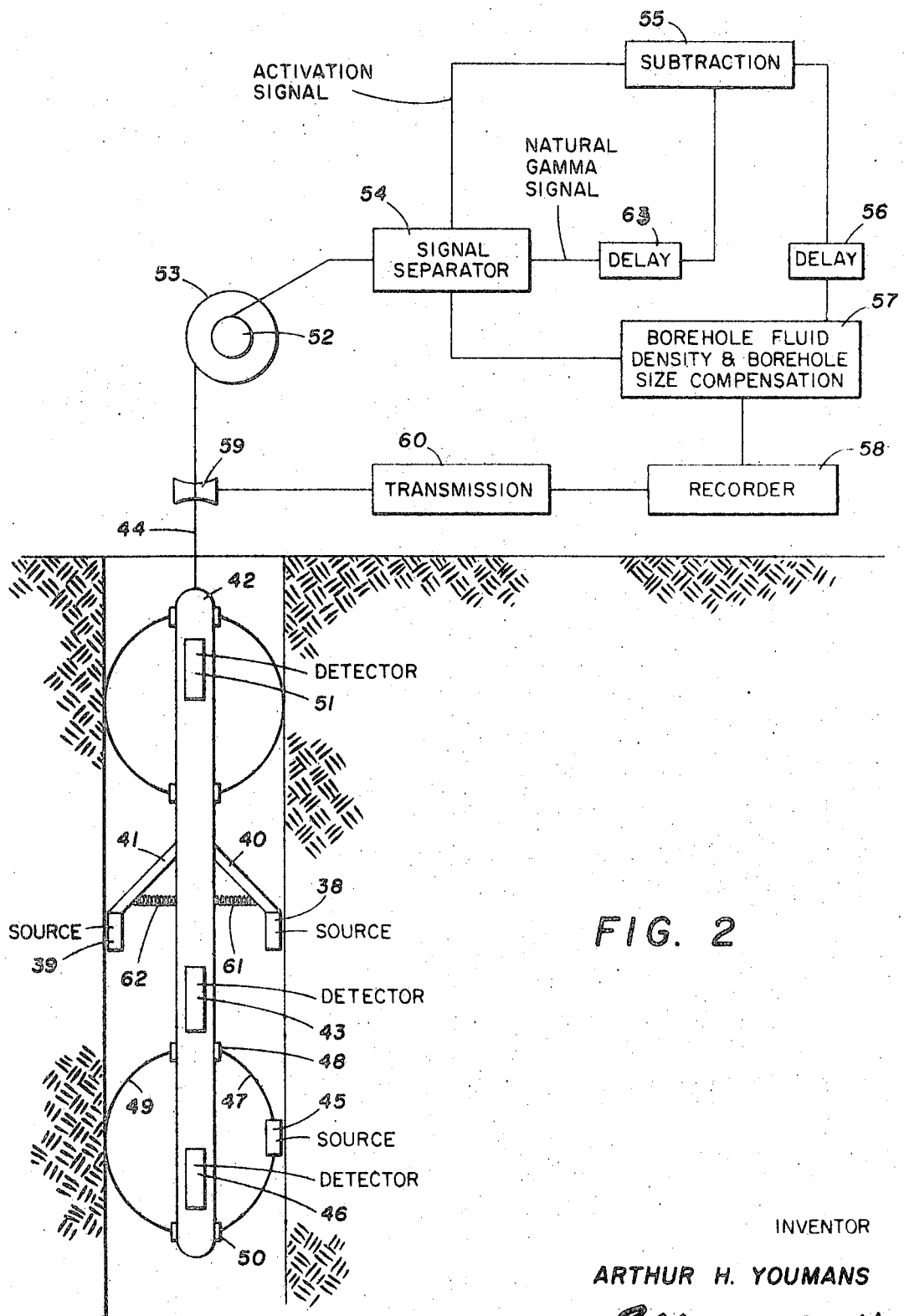
FIG. 2 illustrates another embodiment of the invention.

Referring now to FIG. 2, another embodiment of the present invention is illustrated. Neutron sources 38 and 39 are mounted in pads attached to arms 40 and 41 which extend from subsurface instrument 42. Arms 40 and 41 serve to hold the neutron sources in contact with the borehole wall and centralize the instrument 42. The arms 40 and 41 may be extended and retracted by control from the surface by suitable control means (not shown in the drawing). The arms 40 and 41 may be held in the extended position by spring elements 61 and 62 in order to maintain contact between pads 38 and 39 and the borehole wall. Contained within instrument 42 is a detector 43 for detecting radiation resulting from activation in the formations. The signals from detector 43 are transmitted to the surface equipment along cable 44. Also included in connection with instrument 42 is a means for producing a signal representative of the effect of borehole fluid density and borehole size variations on the activation signal. This means includes a gamma ray source 45 mounted on flexible member 47 and a detector 46. The gamma ray source 45 is selected to have a gamma ray energy spectrum similar to that of the activation radiation to be detected and an intensity great enough to prevent the natural gamma radiation from obscuring the measurements. Gamma ray source 45 is positioned in contact with the borehole wall by flexible member 47 attached to the instrument 42 by connections 48 and 50. An additional flexible member 49 helps keep the instrument centralized in the borehole and the gamma ray source 45 in contact with the borehole wall. The flexible members may be extended and retracted by a suitable means (not shown in the drawing) such as that shown in U. S. Pat. No. 3,200,251 to A. H. Youmans. Since the gamma ray source intensity remains constant but the absorption of the gamma rays varies as the borehole size and/or borehole fluid density varies, the signal produced by detector 46 will show the effects of both borehole fluid density and borehole size variations. Moreover, variations in the signal produced by detector 46 will be substantially identical with variations which occur in the desired activation signal, which traverses substantially the same path through the borehole. This signal is transmitted by cable 44 to be used as a correction for the activation signal from detector 43.

A natural gamma radiation detector 51 is provided in the manner described in connection with the embodiment of FIG. 1. The signal from detector 51 is transmitted up cable 44.

Conventional means 52, including slip rings and brushes, are provided to conduct the signal from cable 44 to signal separator unit 54 wherein it is divided into its component parts which are, respectively, the activation signal from detector 43, the borehole fluid density and borehole size signal from detector 46 and the natural gamma radiation signal from detector 51.

The natural gamma radiation signal is transmitted to the delay unit 63 wherein it is delayed an appropriate amount of time so as to correspond with the activation signal from the same depth. The length of time delay provided depends upon the distance between detectors 51 and 43 and upon the speed at which the instrument 42 is being moved through the borehole.

The natural gamma radiation signal is transferred from delay unit 63 to subtractor 55 and the activation signal is transferred from signal separator 54 to subtractor 55. The resultant signal from subtractor 55 represents the difference between the activation signal and the natural gamma signal, in other words, an improved activation signal with the influence of natural radiation existing in the formations having been greatly reduced, if not completely eliminated.

The improved activation signal is transferred from subtractor 55 to delay unit 56 wherein it is delayed an appropriate amount of time so as to correspond to the borehole fluid density and borehole size signal from the same depth. The improved activation signal is transferred to borehole fluid density and borehole size compensation unit 57 along with the signal from subtractor 46. Unit 57 may be an analog device wherein the correction applied to the activation signal depends upon the magnitude of the borehole fluid density and borehole size signal from detector 46. The improved activation signal is then transferred to a recorder 58. The activation signal may be correlated with depth in the borehole by providing a measuring sheave 59 which contacts cable 44. Sheave 59 drives a transmission 60 which in turn drives the recorder 58, so that the information recorded is related to depth in the borehole.

It is to be understood that the borehole fluid and borehole size signal could be used to compensate both the natural gamma radiation signal and the activation prior to subtracting the natural gamma signal from the activation signal.

A previously described detector 43 monitors radiation emanating from the formations surrounding the borehole. This radiation may result from neutron bombardment of the formations by sources 38 and 39. The radiation has been described as prompt radiation when neutron logging is being performed and delayed radiation when activation logging is being performed. Under certain circumstances it is desirable to log natural radiation from the formations. In such circumstances the formations are not bombarded with neutrons. This may be accomplished by removing the neutron sources or by surrounding the sources with shielding to prevent neutron bombardment of the formations. Detector 43 will detect natural radiation from the formations as instrument 42 is moved through the borehole and the means for producing a signal representing the effect of borehole fluid density variations and borehole size variations will function as previously described. The natural radiation signal is transmitted to signal separator 54 along cable 44 and is processed in the manner described in connection with the activation signal except that a natural gamma signal from detector 51 is not subtracted by subtractor 55. It may be desirable to disconnect or completely remove detector 51 when a natural radiation log is being made.

The various elements of FIGS. 1 and 2 are shown diagrammatically and it is to be understood that the associated circuits and power supplies are provided in a conventional manner. Amplification may be included in the surface instrument, or may be affected both on the surface and in the subsurface instrument. It is also to be understood that the instrument housing will be constructed to withstand the pressures and mechanical and thermal abuses encountered in logging a deep well and provide adequate space within it to house the necessary apparatus and permit the transmission of radiation through it. It is to be further understood that other forms of transmission of signals from the subsurface instrument are contemplated, for example, the signals could be digitized in the subsurface equipment and then transmitted up the cable with the surface processing equipment being of the digital type. Alternatively the signals from the respective detectors and transducers in the subsurface instrument could be recorded on magnetic tape for processing in a digital computer. The various computations, compensations and corrections hereinbefore described could then be performed by the computer instead of by means of the surface instrumentation herein disclosed.

The embodiments of the invention in which an exclusive property or privilege is claimed are defined as follows:

1. A system for investigating characteristics of formations surrounding an earth borehole comprising:
 an instrument for traversing the borehole,
 means connected to said instrument that contact the borehole wall for irradiating the formations with neutrons thereby inducing radiation in the formations,
 means connected to said instrument for measuring the radiation induced in the formations and generating a signal representative of the induced radiation,
 means connected to said instrument for centering said means for measuring the induced radiation and for measuring the diameter of the borehole and generating a signal representing the borehole diameter, and
 means utilizing said signal representing the borehole diameter for compensating said signal representative of the induced radiation for borehole diameter variations, being further characterized as including means for measuring and generating a signal representing natural gamma radiation existing in the formations and means utilizing said signal representing natural gamma radiation for compensating said signal representative of the induced radiation for natural gamma radiation existing in the formations.

2. The system of claim 1 including means for compensating said signal representative of the induced radiation for variations in borehole fluid density.

3. The system of claim 2 including means for recording the compensated signal representative of the induced radiation as a function of depth within the borehole.

4. The system of claim 3 wherein the means for irradiating the formations with neutrons includes an elongated member having one end attached to said instrument, a pad unit attached to the other end of said elongated member and a neutron source held by said pad so that neutrons from said source irradiate the formations.

5. The system of claim 4 including means surrounding said means for measuring the radiation induced in the formations for displacing borehole fluid.

6. A system for investigating the characteristics of formations surrounding an earth borehole comprising:
 an instrument for traversing the borehole,
 a plurality of elongated members each having one end pivotally attached to said instrument, a plurality of pad units, one attached to the other end of each elongated member, a plurality of neutron sources, one held by each pad unit, means connected to said elongated members and instrument detectors for maintaining contact between said pad units and the borehole wall thereby centralizing the instrument in the borehole, means in said instrument for generating a signal representative of formation activation, means connected to said instrument for generating a compensation signal representing the effect of borehole fluid density and borehole diameter variations upon the signal representative of formation activation, and means responsive to said compensation signal for compensating said activation signal for variations in borehole fluid density and borehole diameter, being further characterized as including means to measure and generate a signal representing natural gamma radiation existing in the formation and means to subtract said signal representing natural gamma radiation from said activation signal.

7. The system of claim 6 including means to record said compensated activation signal.

8. The system of claim 7 including means to correlate said compensated activation signal with depth in the borehole.

* * * * *